(12) United States Patent
Spruit et al.

(10) Patent No.: US 7,054,245 B2
(45) Date of Patent: May 30, 2006

(54) RECORD CARRIER, PLAYBACK DEVICE AND METHOD OF RECORDING INFORMATION

(75) Inventors: Johannes H. M. Spruit, Eindhoven (NL); Gijsbert Joseph Van Den Enden, Veldhoven (NL); Johan P. M. G. Linnartz, Eindhoven (NL); Johan C. Talstra, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 63 days.

(21) Appl. No.: 10/382,674

(22) Filed: Mar. 6, 2003

(65) Prior Publication Data

US 2003/0165102 A1    Sep. 4, 2003

Related U.S. Application Data

(63) Continuation of application No. 09/488,027, filed on Jan. 20, 2000, now Pat. No. 6,549,495.

(30) Foreign Application Priority Data

Jan. 27, 1999    (EP) ................................ 99200217

(51) Int. Cl.
*G11B 7/00*    (2006.01)
(52) U.S. Cl. ............... 369/47.19; 369/59.12; 369/111; 369/275.4
(58) Field of Classification Search ........... 369/47.19, 369/59.12, 111, 275.3, 275.4, 59.11, 53.21, 369/44.13
See application file for complete search history.

(56) References Cited

U.S. PATENT DOCUMENTS

| 4,901,300 | A | | 2/1990 | Van Der Zande et al. .... 369/47 |
| 5,187,699 | A | | 2/1993 | Raaymakers et al. ......... 369/48 |
| 5,724,327 | A | * | 3/1998 | Timmermans et al. ... 369/47.24 |
| 6,549,495 | B1 | * | 4/2003 | Spruit et al. ............. 369/47.19 |

FOREIGN PATENT DOCUMENTS

| EP | 838808 A2 | * | 4/1998 |
| EP | 0838808 A2 | | 9/1998 |
| WO | WO9833176 | | 7/1998 |
| WO | WO9833325 | | 7/1998 |

* cited by examiner

*Primary Examiner*—Gautam R. Patel
(74) *Attorney, Agent, or Firm*—Edward W. Goodman (57) ABSTRACT

A record carrier has substantially parallel tracks having first variations of a first physical parameter and second variations of a second physical parameter of the track. The first variations represent information recorded on the record carrier, this information being recoverable by a controllable type of data processing. A modulation pattern of the second variations represents a code for controlling the type of data processing. In respect of a code track that includes the modulation pattern, the modulation pattern in the left neighboring track is aligned to the modulation pattern in the right neighboring track. Thereby crosstalk due to the second variations is decreased, and at least two tracks have the same modulation pattern. The playback device has a demodulator (50) and a control unit (56) for retrieving the code from at least two tracks.

10 Claims, 5 Drawing Sheets

| | | | | | | | | | | |
|---|---|---|---|---|---|---|---|---|---|---|
| Data bits | | | Sync 0 | | | | | | | |
| Channel bits | 0 | 1 1 | 1 0 | 1 0 | 0 0 | 1 | |
| | 1 | 0 0 | 0 1 | 0 1 | 1 1 | 0 | |

| | | | | | | | | | | |
|---|---|---|---|---|---|---|---|---|---|---|
| Data bits | | | Sync 1 | | | | | | | |
| Channel bits | 0 | 1 1 | 1 0 | 1 0 | 0 0 | 1 | |
| | 1 | 0 0 | 0 1 | 0 1 | 1 1 | 0 | |

| | | | | | | | | | | |
|---|---|---|---|---|---|---|---|---|---|---|
| Data bits | | | Sync 2 | | | | | | | |
| Channel bits | 0 | 1 1 | 1 1 | 0 0 | 0 0 | 1 | |
| | 1 | 0 0 | 0 0 | 1 1 | 1 1 | 0 | |

| | | | | | | | | | | |
|---|---|---|---|---|---|---|---|---|---|---|
| Data bits | | | Sync 3 | | | | | | | |
| Channel bits | 0 | 1 1 | 1 0 | 0 1 | 0 0 | 1 | |
| | 1 | 0 0 | 0 1 | 1 0 | 1 1 | 0 | |

RECORD CARRIER, PLAYBACK DEVICE AND METHOD OF RECORDING INFORMATION

CROSS-REFERENCE TO RELATED APPLICATIONS

This is a continuation of U.S. patent application Ser. No. 09/488,027, filed Jan. 20, 2000, now U.S. Pat. No. 6,549,495.

BACKGROUND OF THE INVENTION

1. Field of the Invention

The invention relates to a record carrier comprising substantially parallel tracks having first variations of a first physical parameter of the track, the first variations representing information recorded on the record carrier, the information being recoverable by a controllable type of data processing; and second variations of a second physical parameter of the track, a modulation pattern of the second variations representing a code for controlling said type of data processing.

The invention further relates to a method of recording information on a record carrier, wherein the record carrier is provided with substantially parallel tracks, the method comprising encoding the information in first variations of a first physical parameter of the track, the information being recoverable by a controllable type of data processing; and encoding a code for controlling said type of data processing in a modulation pattern of second variations of a second physical parameter of the track.

The invention further relates to a playback device for recovering information from the record carrier, the device comprising reading means for generating a read signal in dependence on the first variations, and demodulation means for retrieving the code from the modulation pattern of the second variations, and data processing means for processing the read signal for recovering the information in dependence on the code.

2. Description of the Related Art

A system for recording information comprising a record carrier, a recording method and a playback device, is known from U.S. Pat. No. 5,724,327. The record carrier comprises tracks in which the information is represented in a predefined manner by optically readable marks of first variations of a first physical parameter, such as the reflectivity of the scanned surface. The track further has second variations of a second physical parameter, such as a periodic excursion of the track in a transverse direction (further denoted as wobble), a variation in depth, shape or width of the marks. The second variations are modulated and the modulation pattern represents a code which is used for recovering the information, e.g., a de-scramble code for recovering information stored as scrambled information. Said code may constitute a medium mark usable in a system for copy protection, because the track wobble cannot be copied to a recordable disc on standard recording equipment. The playback device comprises reading means for reading the optical marks and demodulation means for retrieving the code from the modulation of the second variations. The player and information carrier form a system for controlled information reproduction. For this purpose, the player comprises data processing means for reproducing the information in dependence on the retrieved code. If the information is copied on a writable information carrier, the information of this copy will not be reproduced by said player, because during the copying process, only the information represented by the first variations is written to the writable information carrier. The copied information carrier does not contain the code, as the second variations cannot be produced by standard recording devices. However, the known system cannot be applied to an existing high-density record carrier, like DVD, because such high-density record carrier systems have tight tolerances on the parameters of the track and the required modulation of a second physical parameter would disrupt the reading of the marks and cause errors in the retrieved information.

SUMMARY OF THE INVENTION

It is an object of the invention to provide a high-density record carrier with a medium mark, and recording and playback means for such a record carrier.

For this purpose, the record carrier as described in the opening paragraph, is characterized in that, with respect to a code track having the modulation pattern, a modulation pattern in a left neighboring track is aligned to a modulation pattern in a right neighboring track. The code track is a track which carries, in its modulation pattern, the code for controlling the data processing when retrieving the recorded information. One or more (or all) tracks on the record carrier may be code tracks. The aligned modulation patterns in the tracks neighboring the code track have the effect that second variations in the left neighboring track are complementary to second variations in the right neighboring track, because irregularities in the second variations due to the modulation are present in both neighboring tracks. Hence, any increase in disturbance caused by a second variation in the left neighboring track is compensated by a decrease in disturbance by a complementary variation in the right neighboring track. Therefore, the tight tolerances on the parameters of the track can effectively be maintained and crosstalk remains limited to acceptable values.

The invention is also based on the following recognition. The amplitude of the second variations must be sufficiently strong for detecting the modulation pattern. However, in a high-density record carrier, the modulation of the second variations in neighboring tracks causes crosstalk, and, therefore, causes noise which degrades the detection of the recorded information and detection of the modulation pattern itself. Hence, the amplitude of the second variations must be as low as possible. The inventors have recognized that by using aligned modulation in neighboring tracks, the maximum noise contribution of the left track does not coincide with the maximum noise contribution of the right track. Hence, a relatively low amplitude of the second variations is sufficient for reliable detection of the modulation pattern. Because of the low amplitude, disruption of the reading of the marks and errors in the retrieved information are minimized.

An embodiment of the record carrier according to the invention is characterized in that the second variations are displacements of the track in a direction transverse to the longitudinal direction of the track, and displacements of the left neighboring track coincide with displacements of the right neighboring track in the same direction. This has the advantage that the crosstalk of the first variations in adjacent tracks is reduced, because if said excursion in the one adjacent track is towards the position of a read spot on the code track and, hence, causes some additional crosstalk, the excursion of the other adjacent track is away from the read spot and, hence, causes less crosstalk.

An embodiment of the record carrier according to the invention is characterized in that the modulation patterns in the code track and the neighboring tracks represent the same code. This has the advantage, that the detection signal of the code track will be stronger because the neighboring tracks have the same modulation. Further, if the second parameter is an excursion in a transverse direction, the distance between the tracks, also called track pitch, at the modulated parts of the track still remains the same, because both tracks have the same transverse excursion. Alternatively, the modulation pattern in the code track is substantially inverse to the modulation pattern in the left neighboring track. This has the advantage for some modulation types, e.g., a wobble in a pre-groove, that the detection signal of the code track is stronger.

An embodiment of the record carrier according to the invention is characterized in that the second variations are periodic and the modulation pattern comprises phase modulation, and phase differences between modulation patterns in adjacent tracks are limited to a predetermined amount. Such a predetermined amount is selected to be smaller than phase differences occurring in said phase modulation. This has the advantage that any disturbance of the neighboring tracks is substantially in phase with a read signal from the modulation pattern in the code track.

According to the invention, the method as described in the opening paragraph, is characterized in that, with respect to a code track having the modulation pattern, a modulation pattern in a left neighboring track is aligned to a modulation pattern in a right neighboring track. The effects and advantages of the method have been explained above with reference to the record carrier.

The playback device as described in the opening paragraph, is characterized in that the device comprises means for retrieving the code from at least two tracks. In the record carrier, the aligned modulation patterns result in at least two tracks having the same modulation pattern and, therefore, representing the same code. In the playback device, the code retrieved from a first track is verified by reading a further track, which carries the same code. This has the advantage that the retrieval of the code is more reliable.

BRIEF DESCRIPTION OF THE DRAWINGS

These and other aspects of the invention will be apparent from and elucidated further with reference to the embodiments described by way of example in the following description and with reference to the accompanying drawings, in which.

Corresponding elements in different Figures have identical reference numerals.

DESCRIPTION OF THE PREFERRED EMBODIMENTS

Figure 1A:
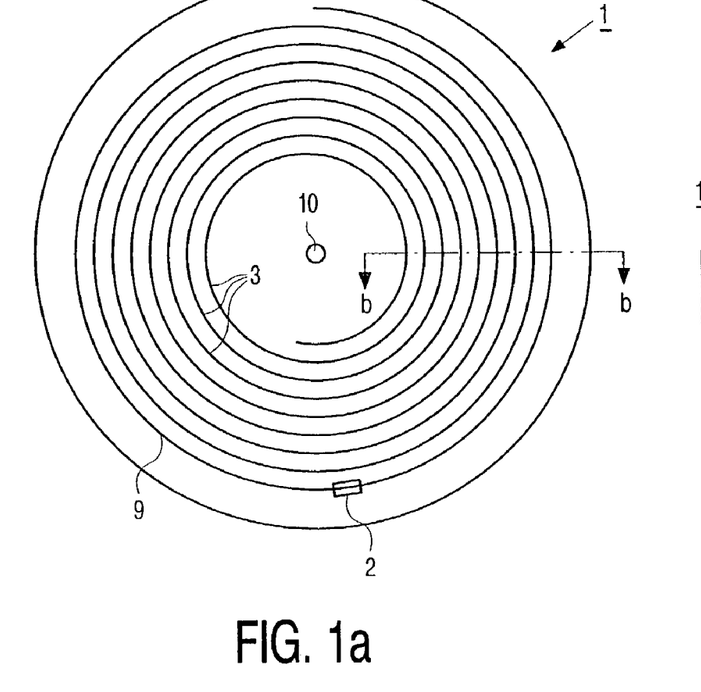
FIGS. 1a–1d show a record carrier.

FIG. 1a shows a disc-shaped record carrier 1 having a track 9 and a central hole 10. The track 9 is arranged in accordance with a spiral pattern of turns constituting substantially parallel tracks on an information layer. The record carrier may be an optical disc having an information layer of a recordable type or of a prerecorded type. Examples of a recordable disc are the CD-R and CD-RW, and the DVD+RW, whereas the audio CD or the DVD video are examples of prerecorded discs. The prerecorded type can be manufactured in a well-known way by first recording a master disc and, via intermediate steps, subsequently pressing consumer discs. The track 9 on the recordable type of record carrier is indicated by a pre-embossed track structure provided during manufacture of the blank record carrier, for example, a pre-groove. The information is represented on the information layer by optically detectable marks recorded along the track. The marks are constituted by variations of a first physical parameter and thereby have different optical properties or magnetic direction than their surroundings, e.g., variations in height, called pits and lands, on a CD.

Figure 1B:
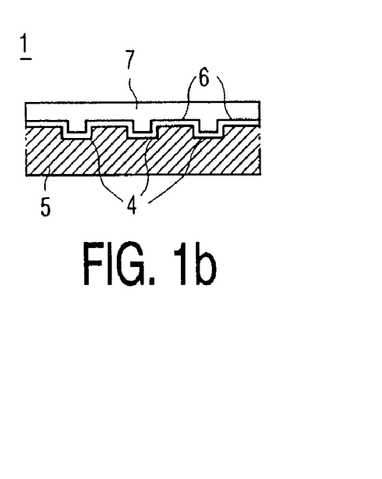

FIG. 1b is a cross-section, taken along the line b—b in FIG. 1a, of the record carrier 1 of the recordable type, in which a transparent substrate 5 is provided with a recording layer 6 and a protective layer 7. The track structure is constituted, for example, by a pre-groove track 4 which enables a read/write head to follow the track 9 during scanning. The pre-groove track 4 may be implemented as an indentation or an elevation, or may consist of a material having a different optical property than the surrounding material. The pre-groove track enables a read/write head to follow the track 9 during scanning. A track structure may also be formed by regularly-spread servo marks which periodically cause servo signals to occur. The record carrier may carry real-time information, for example, video or audio information, or other information, such as computer data.

Figures 1C, 1D:
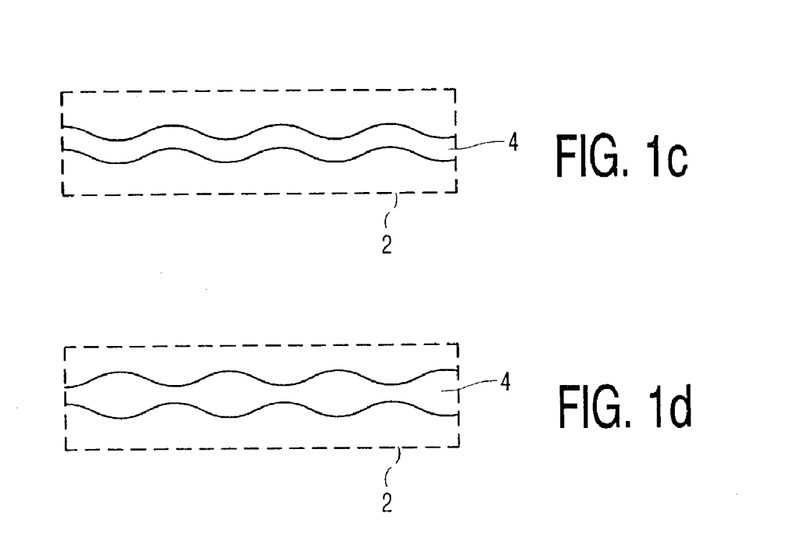

FIGS. 1c and 1d show two examples of a variations of the track. FIG. 1c shows a periodic variation of the lateral position of the track 4, also called wobble. FIG. 1d shows a variation of the width of the track 4. The variations cause an additional signal to arise in the read head, e.g., in a servo tracking detector, of a recorder. The wobble is, for example, frequency modulated and disc information is encoded in the modulation. A comprehensive description of a writable CD system comprising disc information encoded in such a manner can be found in U.S. Pat. No. 4,901,300 (PHN 12.398) and U.S. Pat. No. 5,187,699 (PHQ 88.002). For the read-only type of optical record carriers, the track 4, as schematically drawn in FIG. 1c, is constituted by a series of pits, and the wobble of the track in that case is the periodic variation of the lateral position of the pits.

According to the invention, the wobble comprises a code which is an identifier to support copy-control, anti-piracy and/or other mechanisms. The code contains data for copy protection and anti-piracy mechanisms. It is to be noted that in a recordable disk, the pre-groove or track structure is wobbled, whereas in a pre-recorded record carrier, said detectable marks are wobbled, e.g., a wobble of the pits. During the mastering process, the wobble is written by a laser beam recorder, by imposing a small lateral offset of the center of the pits. The wobble is detectable by the optical pick-up, using the servo control signals.

Figure 2:
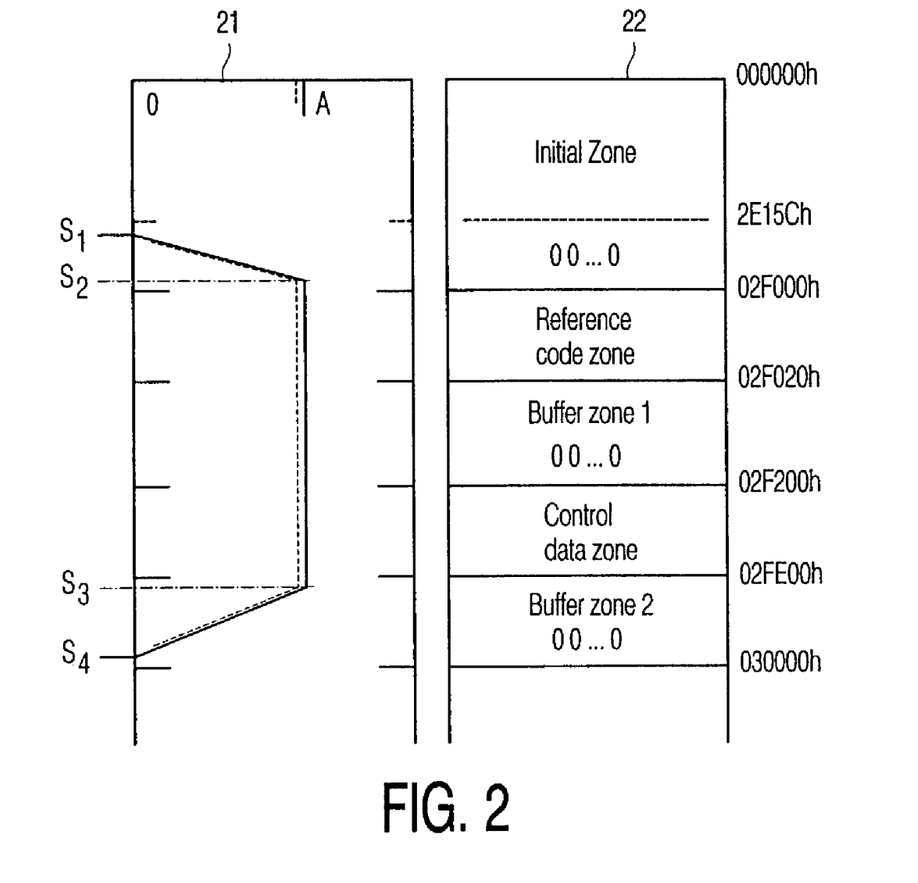
FIG. 2 shows a schematic map of the recorded area and the wobble amplitude.

FIG. 2 shows a schematic map of the recorded area and the wobble amplitude. The schematic map 21 shows the first part of the recorded area and indicates the amplitude A of the wobble. A corresponding address map 22 is shown alongside. The wobble is located only in a limited area of the total recorded area, e.g., at an area within the lead-in area of a disc as indicated in FIG. 2 from S1 to S4. Preferably, the limited area does not comprise essential information, e.g., zero or redundant data. In a DVD type disc, the wobble is provided at specific addresses at the end of the Initial Zone of the Lead-in area, between sector S1, which is larger than or equal to 0x02E15C, and sector S4, which is smaller than or equal to 0x02FF7C.

It is to be noted that if the wobble amplitude is nominal in one track and zero in the neighboring track, that in such boundary tracks, the crosstalk is not compensated as described in the introduction. Hence, in such tracks, an increased noise level is found. In an embodiment of the record carrier, the wobble amplitude in boundary areas (in FIG. 2: S1 to S2 and S3 to S4) will depend on the radial position so as to gradually increase from zero to the nominal amplitude and vice versa. The center area, comprising the nominal amplitude (from S2 to S3), can be used for detecting and retrieving the code, whereas in the boundary areas, the disturbance caused by the wobble decreases to zero, but does not substantially exceed the level in the limited area. In a practical embodiment, the wobble amplitude depends on the address of the sector number as follows. The maximum amplitude is A=30 nm. It shall take on its full amplitude A (only) between sector S2, with S1+0x100<S2<0x02f000, and S3 with 0x02FE00<S3<S4−0x100. This implies that the range where the full amplitude is applied (S3–S2), shall at least cover a reference code zone, buffer zone 1 and the control data zone. The ramp-up and ramp-down of the wobble amplitude takes at least 256 sectors (roughly 16 windings). The amplitude shall be zero for sector numbers below S1 and beyond S4. It linearly increases with sector number from zero to A between S1 and S2. It shall have a constant value of A between sector S2 and S3. It linearly decreases from A to zero between r3 and r4. In practical embodiments, it is permissible that the wobble amplitude increases stepwise per sector number, stepwise per disc winding, or continuously. Preferably, jumps in wobble amplitude shall not exceed 3 nm, and any point on two successive windings, the amplitude difference shall not exceed 3 nm. In practice, on a CD type disc, the wobble location corresponds to radii of 23 to 24 mm. In an embodiment, the wobble has the form of a sinusoidal offset (relative to the center of the track) of the position of the pits which encode the information. The wobble is written with constant angular velocity (CAV), and every track is modulated with the same code and additional control bits. Hence, every winding of the disc contains the same wobble waveform, except possibly for a minute difference in amplitude or phase error. In a practical embodiment, the number of wobble sinusoids per track is 1152. The phase offset between two neighboring tracks is as small as possible. In practice, for a sufficient quality read signal, the phase difference may not exceed 30 degrees, where 360 degrees corresponds to one full wobble sinusoid ($1/1152$th of a disc winding).

The code which is encoded in the wobble may be used as a disc mark. The disc mastering set-up should accept a disc mark seed (e.g., a 64 bit number), from which it creates the wobble code, preferably, using a cryptographic function. For security reasons, no facilities are allowed to directly insert the wobble code. A cryptographic relation can be used between the wobble code and the recorded information on the record carrier, for example, a one-way function between the disc mark and a watermark, i.e., embedded control information, in the audio and/or video information. Further details of the creation and use of a disc mark and verification of the disc mark against additional control information (e.g., a so called control ticket) by a controllable type of data processing can be found in International Patent Application Nos. WO98/33176 and WO 98/33325, both corresponding to U.S. Pat. No. 6,209,092. In an embodiment, the record carrier contains several annular areas with wobbled tracks separated by transit areas. Each area may have a different modulation pattern, whereas the modulation pattern within each individual area is the same. Hence, a number of codes may be encoded in the second variations. The transit areas may have no wobble or have a transit pattern gradually changing the modulation pattern from a first annular area into the modulation pattern of a second annular area.

In an embodiment, the code is provided with error correction symbols for correcting read errors. For error correction, a Reed-Solomon [8,4,5] code over $F_{2^4}$ with rate R=½ may be used. The 64 bits from the cryptographic function are grouped into 4 times 4 symbols. One symbol contains 4 bits. The Reed Solomon encoder operates on 4 symbols at a time. Four user symbols x1, x2, x3, x4 are expanded to x4, x3, x2, x1, 0, 0, 0, 0, 0, 0, 0 (of length 11). Four ECC symbols x12, x13, x14, x15 are obtained using polynomial x4+x+1. The output of the error correction encoder are the 8 symbols x1, x2, x3, x4, x12, x13, x14, x15.

FIGS. 3a–3e show parts of a modulation pattern. The code is represented by data bits, which are converted to a waveform and encoded in the wobble, and are provided with synchronization words for locating the start of the code.

Figure 3A:
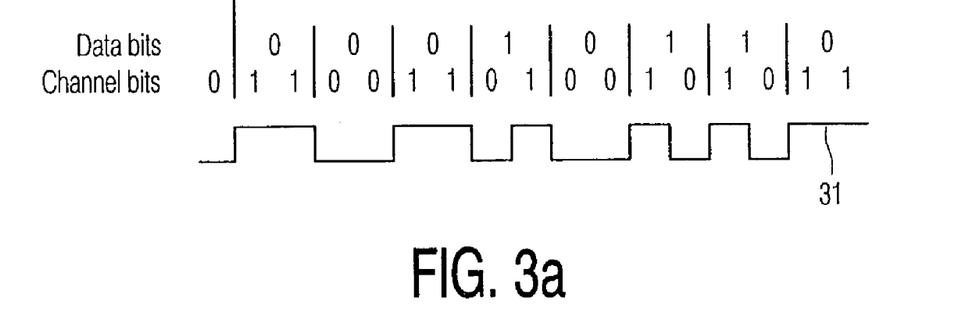
FIGS. 3a–3e show parts of a modulation pattern.

FIG. 3a shows an example of modulation of data bits to channel bits, and the corresponding waveform 31. Data bits are Biphase-Mark coded. In the Biphase-Mark code, two channel bits represent one data bit. The code always has a "0"-to-"1" or a "1"-to-"0" transition at the beginning of a data bit. A second transition shall occur in the middle of the data bit in case it has value "1". In addition to data bits of the code, synchronization words are added for detecting the start of the code. Every group of 4 data symbols shall be preceded by a specific 8 (channel) bit sync word.

Figure 3B:
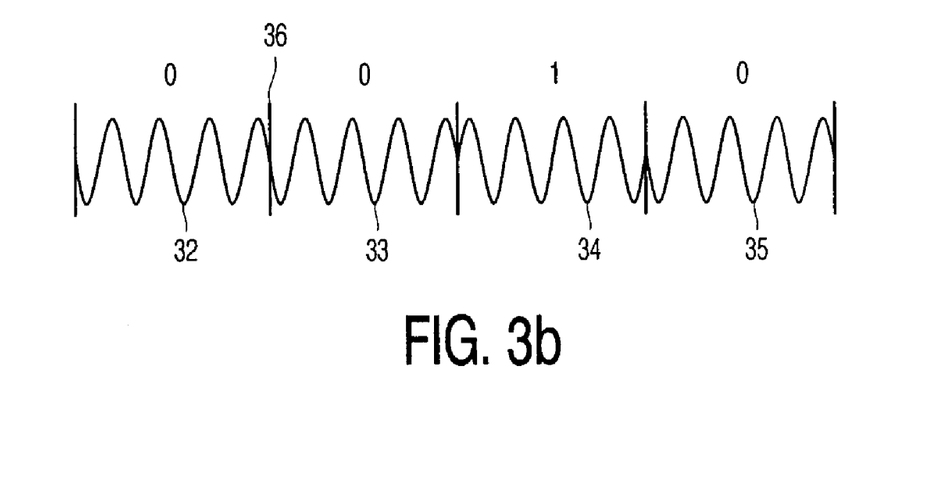

FIG. 3b shows a modulated wobble. The modulation is called binary Phase Shift Keying (PSK). A channel bit contains 4 periods of the wobble sinusoid. Bit transitions 36 occur only at zero crossings of the wobble sinusoids. A first channel bit 32 has value 0, a second channel bit is also 0, a third channel bit 34 is 1 and the fourth channel bit 35 is 0. Due to the Biphase-Mark coding, a data-bit is 8 carrier periods, and FIG. 3b shows two data bits. Due to the R=½ error-correction, the effective bit period is 16 wobble carrier periods. For detecting, it is permissible that the read signal of the modulated wobble is band-pass or high-pass filtered, provided that the band-pass characteristic remains substantially flat, e.g., within 3 dB.

Figure 3C:
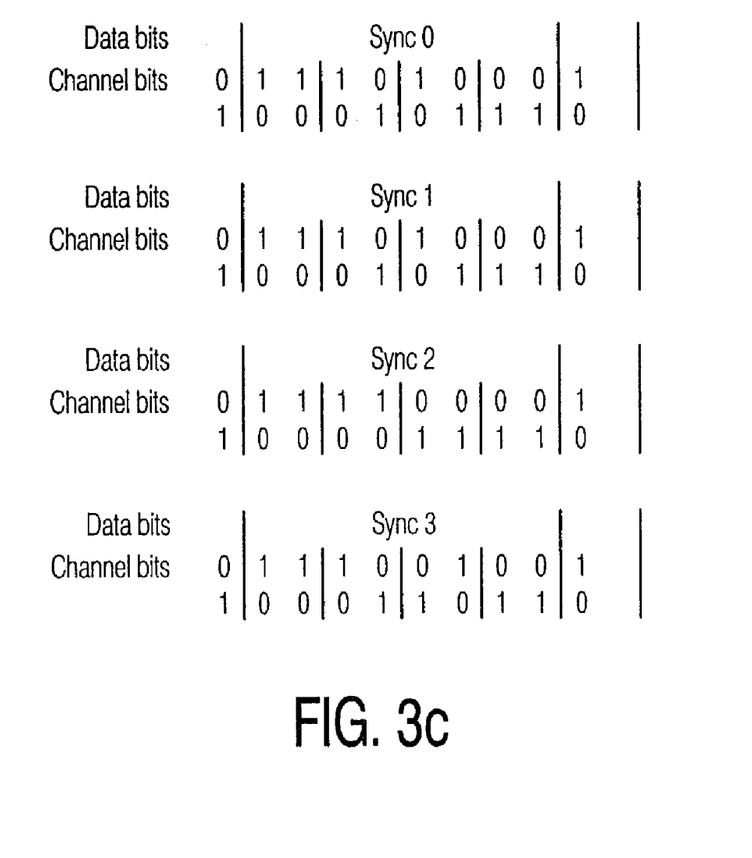

FIG. 3c specifies four different synchronization words. The synchronization words violate the above Biphase-Mark code rule, so that they can be easily recognized. A sync word always starts with a phase reversal. A sync-word has two possible appearances that are each other's (channel-bit) inverse. Which appearance is used depends on the last bit of previous channel bits.

Figure 3D:
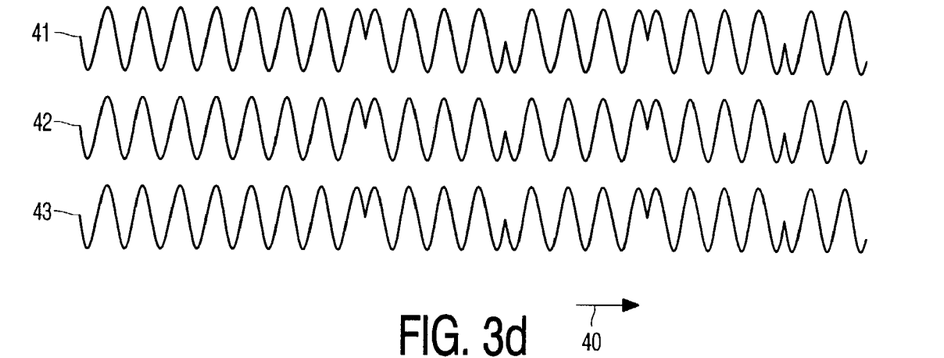
Figure 3E:
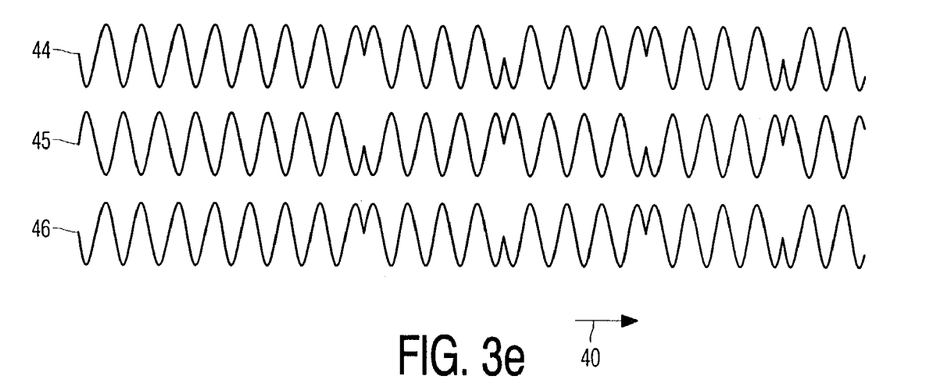

FIGS. 3d and 3e show aligned modulation patterns. These Figures give a detail of a few neighboring tracks, and a modulation pattern of transversal excursion, which is not drawn to scale (in reality, the excursion is 3% to 10% of the track pitch). According to the invention, the modulation patterns are aligned from track to track, i.e., for this type of modulation, the zero crossings are at a corresponding longitudinal position. In the Figures, the middle track 42, 45 is a code track comprising the modulated pattern representing the code, which is to be read from left to right as indicated by arrow 40. In FIG. 3d, the left neighboring track 41 and the right neighboring track 43 have the same modulation pattern as the code track 42. In an embodiment shown in FIG. 3e, the modulation pattern in the left neighboring track 44 is inverse to the modulation pattern in the code track 45.

Right neighboring track 46 again has the polarity of left neighboring track 44. Hence, the modulation is inverted from track to track. In a further embodiment using track width modulation as shown in FIG. 1*d*, the modulation of the left neighboring track is inverse to the modulation of the right neighboring track for achieving the optimum crosstalk compensation. In this case, a maximum width of the left neighboring track is aligned with a minimum width of the right neighboring track. As such, a pattern is formed of, each time, two equal modulated tracks followed by two inverse modulated tracks.

Figure 4:
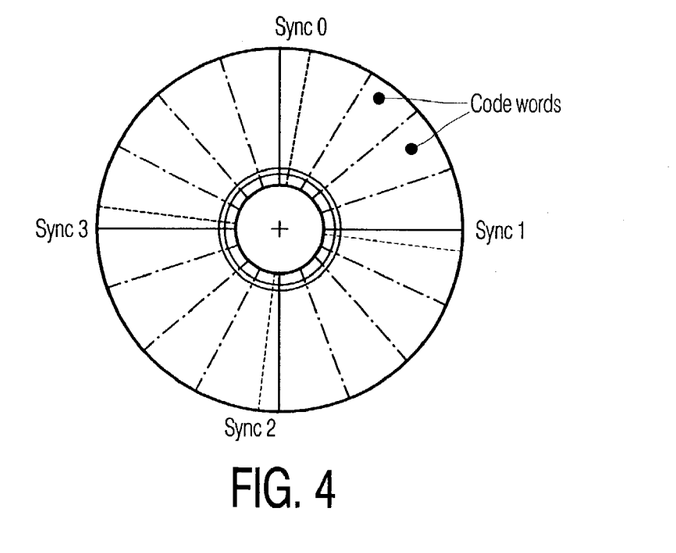
FIG. 4 shows a record carrier layout.

FIG. 4 shows a layout of a record carrier. One winding of the track is encoded with four segments of code words, alternating with sync words. The winding starts with Sync word 0, followed by 64 channel bits, followed by Sync 1, 64 channel bits, Sync 2, 64 channel bits, Sync 3, and 64 channel bits. The next winding contains precisely the same code. The absence of a wobble phase reversal between data bits is permissible between the end of any winding and the start of the next winding, although this violates the bi-phase mark modulation. Hence, the same modulation pattern is present in every wobbled track. In an embodiment of the record carrier, the polarity of the modulation is inverse from track to track, as shown in FIG. 3*e*. This improves the read signal strength for wobble detection in certain track configurations, e.g., detection of servo signals by push-pull detectors used in CD Recordable systems. In a practical embodiment of the record carrier, the tracks contain 64 code bits for wobble key plus 64 bits for ECC, and (4*8)/2 synchronization bits. In total, one winding of the track contains precisely 4*[2*(64+64)+4*8]=1152 wobble periods. When the disc rotates at approximately 25 Hz for reading lead-in area, the wobble frequency fw=1152*25 Hz=28.8 kHz. Such a wobble frequency of about 30 kHz has the advantage that the information encoded in the track by the first variations, has substantially no frequency components in this range, and is also outside the bandwidth of the tracking servo system. Hence, the detection of the modulation pattern is not disturbed by the first variations.

Figure 5:
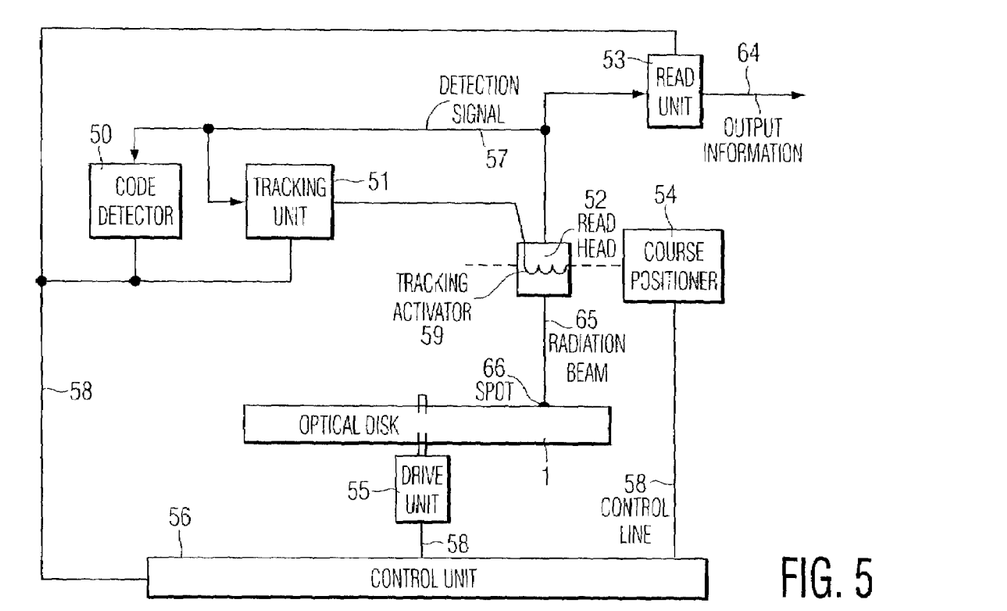
FIG. 5 shows a block diagram of a playback device.
Figure 6:
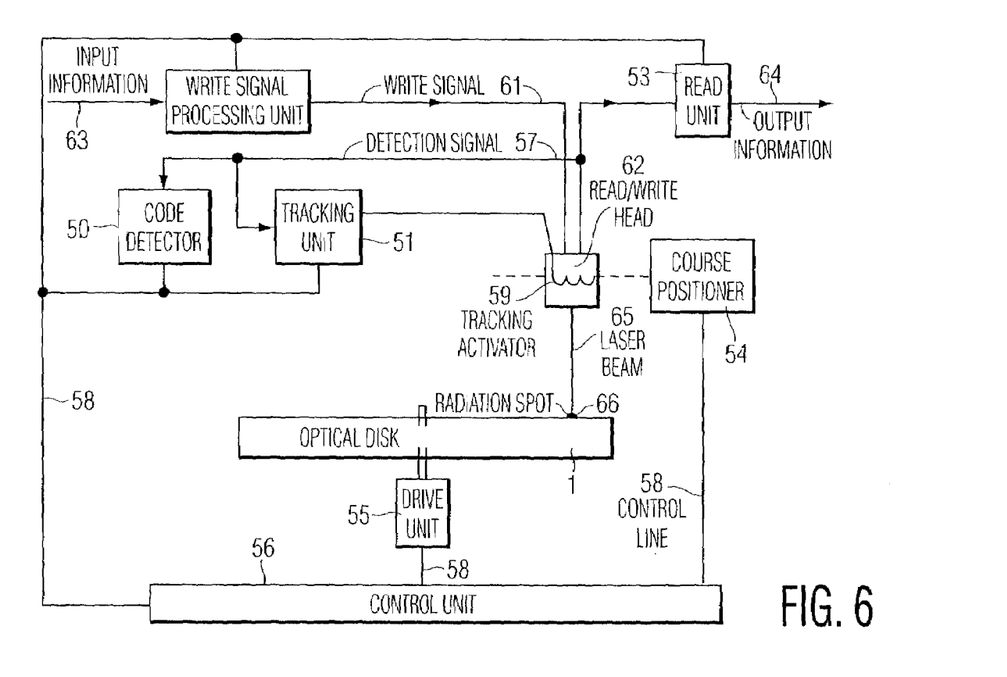
FIG. 6 shows a block diagram of a recording device.

FIGS. 5 and 6 show apparatuses according to the invention for scanning a record carrier 1. The apparatus of FIG. 5 is arranged for reading the record carrier 1, this record carrier being identical to the record carriers shown in FIGS. 1*a*–1*d*. The device is provided with read means comprising a read head 52 for scanning the track on the record carrier, a drive unit 55 for rotating the record carrier 1, a reading unit 53, for example, comprising a channel decoder and an error corrector, a tracking unit 51 and a system control unit 56. The read head comprises an optical system of a known type for generating a radiation spot 66 focused on a track of the recording layer of the record carrier via a radiation beam 65 guided through optical elements. The radiation beam 65 is generated by a radiation source, e.g., a laser diode. The read head further comprises a focusing actuator for focusing the radiation beam 65 on the recording layer and a tracking actuator 59 for fine positioning of the spot 66 in a radial direction on the center of the track. The tracking actuator 59 may comprise coils for radially moving an optical element or may be arranged for changing the angle of a reflecting element on a movable part of the read head, or on a part on a fixed position in the case part of the optical system is mounted on a fixed position. The radiation reflected by the recording layer is detected by a detector of a usual type, e.g., a four-quadrant diode, for generating a detector signals 57 including a read signal, a tracking error and a focusing error signal. The apparatus is provided with a tracking unit 51 coupled to the read head for receiving the tracking error signal from the read head and controlling the tracking actuator 59. The tracking unit may, for example, be of the differential phase detection (DPD) type, in which the deviation of the read head in relation to the centerline of the track is detected from phase differences which occur between signals from sub-detectors when scanning a mark (e.g., a pit) in the track. Alternatively, the tracking unit may be of the well-known push-pull type, in which said deviation is detected based on detector signals from the left and rights side of the track. During reading, the read signal is converted into output information, indicated by arrow 64, in the reading unit 53. For this purpose, the reading unit 53 comprises data processing of a controllable type, which are to be controlled based on a code from the record carrier, for example, access control may be performed based on the code retrieved from the record carrier. The apparatus has positioning means 54 for coarsely positioning the read head 52 in the radial direction on the track, the fine positioning being performed by the tracking actuator 59. The apparatus is provided with a code detector 50 for detecting and demodulating the code from the detector signals 57 when scanning a code track that comprises the modulation pattern. For example, the track may be modulated by periodic excursions transverse to the longitudinal track direction as described above with reference to FIGS. 3*a*–3*e*. Such modulation can be detected from the radial tracking servo signals. The device is further provided with a control unit 56 for receiving commands from a controlling computer system or from a user and for controlling the apparatus via control lines 58, e.g., a system bus connected to the drive unit 55, the positioning means 54, the code detector 50, the tracking unit 51 and the reading unit 53. To this end, the control unit comprises control circuitry, for example, a microprocessor, a program memory and control gates, for performing the procedures described below. The control unit 56 may also be implemented as a state machine in logic circuits. The control unit 56 is arranged for retrieving the code from the track via the code detector 50, and for controlling the type of data processing in the reading unit 53. For example, the code may be a de-scramble key, which is used for decrypting copy protected video information. For reliable detection of the code, the control unit 56 is arranged for detecting the code from at least two tracks. A first code track is located by positioning the read head at a predetermined track, e.g., at a predetermined radial position or a predetermined address. Then, the code is detected from said first code track. For verifying the detected code, a second code track is scanned, e.g., the next winding of the track. The second detected code is compared with the first code, and if equal, the code is passed on to the data processing unit. In an embodiment of the system, the code may be provided with error detection symbols, and the control unit may decide to read the code from a different code track only if errors are indicated by said error symbols. Alternatively, the control unit may be arranged for reading two tracks which are at different radial positions and comparing the retrieved codes. In the event that the retrieved codes are not equal, further tracks are read and the retrieved codes (or the read signals) are kept in memory until the code can be determined with a sufficient certainty, e.g., at least 4 out of 5 tracks had the same code. In an embodiment, the read device comprises means for locating a modulated area, i.e., a limited area of the record carrier that comprises modulated tracks as described above with reference to FIG. 2. The device may have a memory containing predetermined modulated area address information for locating the modulated area. Alternatively, such address information may be provided on the record carrier, for example, in a system information area. The control unit 56 is arranged for controlling the positioning means 54 and the tracking actuator 59 for accessing a code track in the modulated area of the record carrier as indicated by the modulated area address information.

FIG. 6 shows a device for writing information on a record carrier according to the invention of a type which is (re) writable in, for example, a magneto-optical or optical manner (via phase change or dye) by means of a beam 65 of electromagnetic radiation. The device is usually also equipped for reading and comprises the same elements as the apparatus for reading described above with FIG. 5, except that it comprises write means which includes a write/read head 62 and a write signal processing unit 60, which comprises, for example, a formatter, an error encoder and a channel encoder. The write/read head 62 has the same function as the read head 52 together with a write function and is coupled to the write signal processing unit 60. The information presented to the input of the write signal processing unit 60 (indicated by the arrow 63) is distributed over logical and physical sectors according to formatting and encoding rules and converted into a write signal 61 for the write/read head 62. The system control unit 56 is arranged for controlling the write signal processing unit 60 and for performing the position information recovery and positioning procedure as described above for the reading apparatus. During the writing operation, marks representing the information are formed on the record carrier. Writing and reading of information for recording on optical discs and usable formatting, error correcting and channel coding rules, are well-known in the art, e.g., from the CD system. In particular, the code detecting means 50 are arranged for retrieving the code from the modulated tracks as described with the read apparatus. A data clock is used to control the write signal processing unit 60 and/or the reading unit 53. Data clock generation means can be controlled by the system control unit 56 based on the radial position, e.g., on a zone and the rotation rate of the disc, and/or may be locked to the wobble.

A recording method for providing a blank record carrier with modulated tracks comprises the following steps. In the method, the record carrier is provided with substantially parallel tracks, and the information is encoded in first variations of a first physical parameter of the track, this information being recoverable by means of a controllable type of data processing; and a code for controlling said type of data processing is encoded in a modulation pattern of second variations of a second physical parameter of the track. In respect of a code track that comprises the modulation pattern, the modulation pattern in the left neighboring track is aligned to the modulation pattern in the right neighboring track. This may be achieved by accurately controlling the modulation of the second variations, e.g., the radial positioning of the track in relation to the rotational position of a disc-shaped record carrier. Alternatively, a second read head may be used to read the modulation pattern at a position two tracks before the track being written. In an embodiment, the record carrier is rotated and the modulation is controlled in dependence on said rotational position. Such control is achieved by using tacho-pulses from a motor that rotates the record carrier, and locking a waveform generator to the tacho-pulses. The waveform generator further comprises the code for modulating the second variations during writing.

Although the invention has been explained mainly by embodiments using the wobble (a variably modulated transverse excursion), any suitable modulation of a parameter of the track may be modulated, e.g., the average reflection of a written part or the shape of certain pits. Also, for the information carrier, an optical disc has been described, but other media, such as, a magnetic disc or tape, may be used. Further, the invention lies in each and every novel feature or combination of features described above.

The invention claimed is:

1. A record carrier comprising substantially parallel tracks having:
    first variations of a first physical parameter of the track, the first variations representing information recorded on the record carrier, said information being recoverable by a controllable type of data processing; and
    second variations of a second physical parameter of the track, a modulation pattern of the second variations representing a code for controlling said type of data processing,
characterized in that, with respect to a code track comprising said modulation pattern, a modulation pattern in a left neighboring track is aligned to a modulation pattern in a right neighboring track.

2. A record carrier comprising substantially parallel tracks having:
    first variations of a first physical parameter of the track, the first variations representing information recorded on the record carrier, said information being recoverable by a controllable type of data processing; and
    second variations of a second physical parameter of the track, a modulation pattern of the second variations representing a code for controlling said type of data processing,
characterized in that, with respect to a code track comprising said modulation pattern, a modulation pattern in a left neighboring track is aligned to a modulation pattern in a right neighboring track, wherein the second variations are displacements of the track in a direction transverse to a longitudinal direction of the track, and displacements of the left neighboring track coincide with displacements of the right neighboring track in the same direction.

3. The record carrier as claimed in claim 2, wherein the modulation patterns in the code track and the neighboring tracks represent the same code.

4. The record carrier as claimed in claim 3, wherein the modulation pattern in the code track is substantially inverse to the modulation pattern in the left neighboring track.

5. The record carrier as claimed in claim 3, wherein the second variations are periodic, and the modulation pattern comprises phase modulation, and phase differences between modulation patterns in adjacent tracks are limited to a predetermined amount.

6. The record carrier as claimed in claim 1, wherein the tracks constitute a spiral or concentric pattern of tracks, and adjacent tracks in the pattern of tracks exhibit a same number of the second variations.

7. The record carrier as claimed in claim 1, wherein only tracks in a limited area of the record carrier exhibit said second variations.

8. The record carrier as claimed in claim 7, wherein the limited area comprises a boundary zone between an area not exhibiting second variations and a center area exhibiting the second variations at a predetermined amplitude, the amplitude of the second variations in the boundary area increasing from zero to the predetermined amplitude.

9. A playback device for recovering information from a record carrier comprising substantially parallel tracks having first variations of a first physical parameter of the track, the first variations representing information recorded on the record carrier, said information being recoverable by a controllable type of data processing; and second variations of a second physical parameter of the track, a modulation pattern of the second variations representing a code for controlling said type of data processing, in which, with respect to a code track comprising said modulation pattern, a modulation pattern in a left neighboring track is aligned to a modulation pattern in a right neighboring track, the playback device comprising:

reading means for generating a read signal in dependence on the first variations;

demodulation means for retrieving the code from the modulation pattern of the second variations; and     data processing means for processing the read signal for recovering the information in dependence on the code, characterized in that the device comprises means for retrieving the code from at least two tracks.

10. The playback device as claimed in claim 9, in which only tracks in a limited area of the record carrier exhibit said second variations, wherein the playback device further comprises:

means for locating the limited area.

* * * * *